(12) United States Patent
Sugiyama et al.

(10) Patent No.: US 11,012,808 B2
(45) Date of Patent: May 18, 2021

(54) IN-VEHICLE TERMINAL AND RIDE-SHARING CONTROL METHOD

(71) Applicant: TOYOTA JIDOSHA KABUSHIKI KAISHA, Toyota (JP)

(72) Inventors: Koseki Sugiyama, Suntou-gun (JP); Atsuko Kobayashi, Nagoya (JP); Hiroki Asano, Toyota (JP); Harunobu Saito, Nagoya (JP); Yoshihiro Tsuge, Toyota (JP); Tae Sugimura, Miyoshi (JP); Kuniaki Jinnai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/443,912

(22) Filed: Jun. 18, 2019

(65) Prior Publication Data

US 2019/0394609 A1 Dec. 26, 2019

(30) Foreign Application Priority Data

Jun. 22, 2018 (JP) .............................. JP2018-119030

(51) Int. Cl.
*H04W 4/21* (2018.01)
*H04W 4/40* (2018.01)
*H04W 4/021* (2018.01)

(52) U.S. Cl.
CPC ............. *H04W 4/021* (2013.01); *H04W 4/40* (2018.02)

(58) Field of Classification Search
CPC ...... H04W 4/021; H04W 4/40; B60R 16/037; B60R 25/01; B60R 25/241; B60W 10/30; B60W 50/0098; B60W 2710/30; B60W 2540/22; B60W 2540/04; G01C 21/362; G06Q 50/30; G06Q 30/0611; G07C 9/00309; B60Q 9/00; G08G 1/123; G08G 1/00; G08G 1/09
See application file for complete search history.

(56) References Cited

U.S. PATENT DOCUMENTS

| 10,412,088 | B2* | 9/2019 | Darnell .................... H04L 63/10 |
| 10,703,382 | B2* | 7/2020 | Sweeney ........... B60W 60/0053 |
| 10,726,360 | B2* | 7/2020 | Fujimoto ............... G08G 1/123 |
| 2015/0081362 | A1* | 3/2015 | Chadwick ........ G06Q 10/06311 705/7.14 |
| 2016/0334232 | A1* | 11/2016 | Zhuang .............. G01C 21/3438 |
| 2017/0132534 | A1* | 5/2017 | Darnell ................. H04L 9/3234 |
| 2017/0308817 | A1* | 10/2017 | Miller .................... G06Q 10/02 |
| 2018/0053276 | A1* | 2/2018 | Iagnemma ....... G06Q 10/06315 |
| 2019/0109854 | A1* | 4/2019 | Shimizu ............. H04L 63/0876 |

(Continued)

FOREIGN PATENT DOCUMENTS

JP 2009-289192 A 12/2009
JP 2014-146261 A 8/2014

*Primary Examiner* — Khawar Iqbal
(74) *Attorney, Agent, or Firm* — Oliff PLC

(57) ABSTRACT

An in-vehicle terminal mounted in a vehicle includes a controller configured to: transmit a radio signal indicating that it is possible to share a ride in the vehicle; upon receipt of the radio signal from a user terminal that has received the radio signal, transmit information relating to the vehicle to the user terminal; and receive information indicating a result of determination of whether or not a user of the user terminal can join the ride in the vehicle, the determination being made using the information relating to the vehicle, from the user terminal.

12 Claims, 12 Drawing Sheets

(56) References Cited

U.S. PATENT DOCUMENTS

| | | | |
|---|---|---|---|
| 2019/0228345 A1* | 7/2019 | Oesterling | G06Q 10/02 |
| 2019/0278959 A1* | 9/2019 | Engelke | G06Q 50/30 |
| 2019/0354903 A1* | 11/2019 | Seki | G06Q 10/02 |
| 2019/0378095 A1* | 12/2019 | Kim | G06Q 10/1095 |
| 2019/0392731 A1* | 12/2019 | Ohtani | G06Q 50/20 |
| 2020/0150660 A1* | 5/2020 | Kim | B60R 25/24 |
| 2020/0160474 A1* | 5/2020 | Mitra | G02B 27/022 |
| 2020/0217673 A1* | 7/2020 | Bansal | G06Q 30/0605 |
| 2020/0293424 A1* | 9/2020 | Zhang | G06F 17/18 |

* cited by examiner

VEHICLE-RELATED INFORMATION

| VEHICLE ID |
| --- |
| DESTINATION INFORMATION |
| VEHICLE ATTRIBUTE INFORMATION |
| DRIVER ATTRIBUTE INFORMATION |
| RIDE-SHARING CONDITION INFORMATION |

Fig. 6A

USER-RELATED INFORMATION

| USER ID |
| --- |
| DESTINATION INFORMATION |
| USER ATTRIBUTE INFORMATION |
| USER REQUEST INFORMATION |

Fig. 6B

IN-VEHICLE TERMINAL AND RIDE-SHARING CONTROL METHOD

CROSS REFERENCE TO RELATED APPLICATION

This application claims priority to Japanese Patent Application No. 2018-119030, filed on Jun. 22, 2018, which is hereby incorporated by reference herein in its entirety.

BACKGROUND

Technical Field

The present disclosure relates to an in-vehicle terminal, a user terminal and a ride-sharing control method.

Description of the Related Art

In recent years, a form of transportation in which a plurality of people share a ride in a same vehicle have been prevailing. As a technique relating to ride-sharing between persons that are strangers to each other, there is a fellow passenger search system including a management server that stores information relating to users and user terminals carried by users, in which in response to a request from a user terminal, the management server searches for a fellow passenger that is another user that shares a ride in a vehicle for travelling (for example, patent document 1).

CITATION LIST

Patent Document

[Patent document 1] Japanese Patent Laid-Open No. 2014-146261
[Patent document 2] Japanese Patent Laid-Open No. 2009-289192

SUMMARY

An object of the present disclosure is to provide a technique that enables grasping whether or not a user located within a coverage of a radio signal from a vehicle can share a ride in the vehicle.

An aspect of the present disclosure provides an in-vehicle terminal mounted in a vehicle. The in-vehicle terminal includes a controller configured to:
transmit a radio signal indicating that it is possible to share a ride in the vehicle;
upon receipt of the radio signal from a user terminal that is located within a range in which the radio signal reaches and can receive the radio signal, transmit information relating to the vehicle to the user terminal; and
receive information indicating a result of determination of whether or not a user of the user terminal can join the ride in the vehicle, the determination being made using the information relating to the vehicle, from the user terminal.

Another aspect of the present disclosure provides a ride-sharing control method including causing an in-vehicle terminal mounted in a vehicle to:
transmit a radio signal indicating that it is possible to share a ride in the vehicle;
upon receipt of the radio signal from a user terminal that is located within a range in which the radio signal reaches and can receive the radio signal, transmit information relating to the vehicle to the user terminal; and
receive information indicating a result of determination of whether or not a user of the user terminal can join the ride in the vehicle, the determination being made using the information relating to the vehicle, from the user terminal.

Another aspect of the present disclosure provides a user terminal. The user terminal includes a controller configured to:
receive a radio signal indicating that it is possible to share a ride in a vehicle, the radio signal being transmitted from an in-vehicle terminal mounted in the vehicle, within a coverage of the radio signal;
transmit a response to the radio signal;
receive information relating to the vehicle from the in-vehicle terminal that has received the response;
determine whether or not a user of the user terminal can join the ride in the vehicle, using the information relating to the vehicle; and
generate information relating to a result of the determination and transmit the information to the in-vehicle terminal.

Another aspect of the present disclosure provides a ride-sharing control method including causing a user terminal to:
receive a radio signal indicating that it is possible to share a ride in a vehicle, the radio signal being transmitted from an in-vehicle terminal mounted in the vehicle, within a coverage of the radio signal;
once the user terminal transmits a response to the radio signal, receive information relating to the vehicle from the in-vehicle terminal that has received the response;
determine whether or not a user of the user terminal can join the ride in the vehicle, using the information relating to the vehicle; and
generate information relating to a result of the determination and transmit the information to the in-vehicle terminal.

Another aspect of the present disclosure provides an in-vehicle terminal mounted in a vehicle. The in-vehicle terminal includes a controller configured to:
transmit a radio signal indicating that it is possible to join a ride in the vehicle;
receive, from a user terminal that is located within a coverage of the radio signal and can receive the radio signal, information relating to a user of the user terminal;
determine whether or not the user can join the ride in the vehicle, using the information relating to the user; and
generate information indicating a result of the determination and transmit the information to the user terminal.

Another aspect of the present disclosure provides an in-vehicle terminal mounted in a vehicle. The in-vehicle terminal includes a controller configured to:
receive a radio signal indicating a ride-sharing request of a user of a user terminal, the radio signal being transmitted from the user terminal, within a coverage of the radio signal;
transmit information relating to the vehicle to the user terminal; and
receive information indicating a result of determination of whether or not the user can join a ride in the vehicle, the determination being made based on the information relating to the vehicle, from the user terminal.

Another aspect of the present disclosure provides a program for causing a computer to execute the above-stated ride-sharing control method, and a recording medium storing the program.

The present disclosure enables grasping whether or not a user located within a coverage of a radio signal from a vehicle can share a ride in the vehicle.

BRIEF DESCRIPTION OF THE DRAWINGS

FIG. 6A is a diagram of vehicle-related information and FIG. 6B is a diagram of user-related information;

DESCRIPTION OF THE EMBODIMENTS

Figure 1:
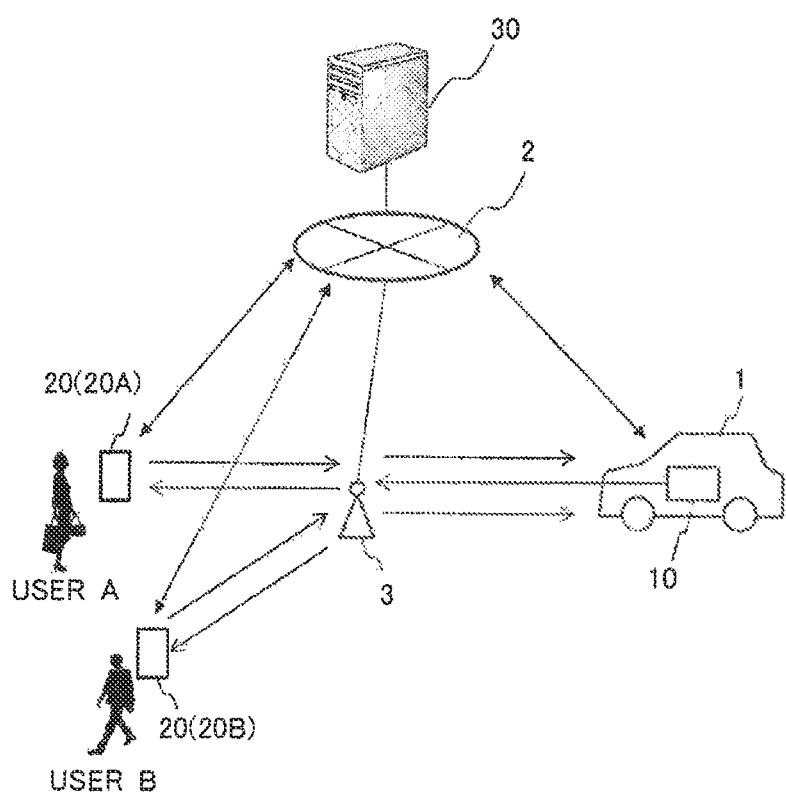
FIG. 1 is a diagram illustrating an example configuration of an information processing system according to a first embodiment.

The below description of embodiments includes description of an in-vehicle terminal including a controller configured to execute (a) to (c) below and a ride-sharing control method including (a) to (c) below:

(a) transmitting a radio signal indicating that it is possible to share a ride in a vehicle;

(b) upon receipt of the radio signal from a user terminal that is located within a coverage of the radio signal and can receive the radio signal, transmitting information relating to the vehicle to the user terminal; and (c) receiving information indicating a result of determination of whether or not a user of the user terminal can join the ride in the vehicle, the determination being made using the information relating to the vehicle, from the user terminal.

According to the above-stated in-vehicle terminal, the controller of the in-vehicle terminal mounted in the vehicle transmits a radio signal indicating that it is possible to share a ride in the vehicle. User terminals that are located within a coverage of the radio signal from the vehicle and can receive the radio signal receive the radio signal. If the controller receives a response to the radio signal from a user terminal, the controller transmits information relating to the vehicle to the user terminal. Then, the in-vehicle terminal receives, from at least one of the user terminals, a result of determination of whether or not a user of the user terminal can join the ride in the vehicle, the determination being made using the information relating to the vehicle. Consequently, for each of users located within the coverage of a radio signal from the vehicle, the in-vehicle terminal can grasp whether or not the user can join the ride in the vehicle.

In order to cause a user terminal, an address of which is unknown to the in-vehicle terminal, to be included in destinations of the aforementioned radio signal, the radio signal may be transmitted via broadcasting. However, a user terminal, an address of which is known to the in-vehicle terminal, may be set as a destination and a radio signal addressed to the known user terminal may be transmitted via unicasting. Also, the aforementioned response may be transmitted with no conditions upon reception of the radio signal by the user terminal. However, it is also possible that if a setting indicating the user wishes to join a ride is made in the user terminal (for example, a ride-sharing request flag is on), a response is transmitted. Alternatively, it is possible that for example, if the user is notified of it being possible to share a ride and the user performs an input to the effect that the user wishes to join the ride to the user terminal, a response is transmitted.

The information relating to the vehicle includes, for example, at least one of information indicating a destination of the vehicle, information indicating attributes of the vehicle, information indicating attributes of a driver of the vehicle and information indicating ride-sharing conditions other than the attributes of the vehicle and the attributes of the driver. Consequently, whether or not it is possible to join the ride can be determined based on various types of information.

Also, the controller in the in-vehicle terminal may employ a configuration that transmits a radio signal including first information in the information relating to the vehicle and receives the response from one or more user terminals each having user request information matching the first information from among a plurality of user terminals that are located within a coverage of the radio signal and can receive the radio signal. The first information can include at least one of the information indicating the destination of the vehicle, the information indicating the attributes of the vehicle, the information indicating the attributes of the driver of the vehicle and the information indicating ride-sharing conditions other than the attributes of the vehicle and the attributes of the driver.

In other words, regarding transmission of the information relating to the vehicle, the in-vehicle terminal may transmit the information if the in-vehicle terminal receives a response to the radio signal or may transmit a part of the information in such a manner that the part is included in the radio signal (together with the radio signal) and transmit the remaining part of the information to a relevant user terminal after reception of a response.

Also, the in-vehicle terminal may be configured to if the in-vehicle terminal receives the response, establish a communication channel with the user terminal and transmit/receive the information relating to the vehicle and information indicating a result of possibility determination using the communication channel.

Also, a configuration in which the aforementioned controller in the in-vehicle terminal transmits assistance information for assisting in the user riding in the vehicle to the user terminal if the user joins the ride in the vehicle may be employed. Also, a configuration in which when a distance between the vehicle and the user terminal becomes shorter than a predetermined value, the aforementioned controller in the in-vehicle terminal transmits information for notification of the approach of the vehicle, to the user terminal may be employed.

Also, the below description of the embodiments includes description of a user terminal that communicates with the aforementioned in-vehicle terminal. Also, the below description of the embodiments includes description of a mode in which the in-vehicle terminal obtains information relating to a user from a user terminal and determines whether or not it is possible to share a ride with the user. In this case, also, ride-sharing control can be performed by means of communication between the in-vehicle terminal and the user terminal not via a server. Note that ride-sharing possibility determination may be made by processing distributed between the in-vehicle terminal and the user terminal. Also, the below description of the embodiments includes description of a mode in which upon reception of a radio signal indicating a user's ride-sharing request, the in-vehicle terminal transmits information relating to the vehicle to the relevant user terminal.

An in-vehicle terminal, a user terminal and a ride-sharing control method according to each of embodiments of the present disclosure will be described below with reference to the drawings. A configuration of each of the embodiments is a mere example and the present disclosure is not limited to such configuration of each embodiment.

First Embodiment

<System Configuration>
FIG. 1 is a diagram illustrating an example configuration of an information processing system according to a first embodiment. In FIG. 1, the information processing system includes an in-vehicle terminal 10 and one or more user terminals 20. The in-vehicle terminal 10 is a communication terminal mounted in a vehicle 1. The user terminals 20 are one or more communication terminals that are carried by persons who wish to join a ride and can communicate with the in-vehicle terminal 10. Although FIG. 1 illustrates a single vehicle 1 and a single in-vehicle terminal 10, there may be two or more vehicles 1 and two or more in-vehicle terminals 10. Also, although FIG. 1 illustrates user terminals 20A and 20B as examples of the user terminals 20, there may be a single or three or more user terminals 20.

The in-vehicle terminal 10 and the user terminals 20 can transmit/receive data via a network 2. The network 2 includes, for example, a WAN (wide-area network), which is a worldwide public communication network such as the Internet, and an access network for the WAN. However, a communication network other than a WAN may be employed. The access network is, for example, a radio network adapted to or complying with a predetermined radio communication standard (radio access technology (RAT)). Examples of the radio communication standard (RAT) include, e.g., cellular communication standards such as 3G, LTE (Long-Term Evolution) and 5G, wireless LANs (including IEEE 802.11 series and WiFi), Bluetooth (registered trademark), BLE (Bluetooth (registered trademark) Low Energy) and CV2X (cellular vehicle-to-everything). However, the radio communication standard is not limited to the aforementioned examples as long as the radio communication standard enables proper communication of information between the in-vehicle terminal 10 and the user terminals 20.

In the present embodiment, the in-vehicle terminal 10 and the user terminals 20 transmit/receive information and data relating to ride-sharing to each other directly (not via a server). For transmission/reception, a communication channel can be established between the in-vehicle terminal 10 and each of the user terminals 20. The in-vehicle terminal 10 and the user terminals 20 communicate information and data relating to ride-sharing by means of peer-to-peer (P2P) communication or inter-device communication (D2D (Device-to-Device) communication). Here, peer-to-peer means that roles of an in-vehicle terminal and a user terminal are not determined unlike a client (service-requesting side) and a server (service (such as information and an operation result)-providing side) in a client/server system. Each of the in-vehicle terminal and the user terminal requests the opposite party to provide information or an operation result as appropriate. For example, in the first embodiment, the in-vehicle terminal 10 provides information relating to the vehicle to a user terminal 20. On the other hand, the user terminal 20 determines whether or not it is possible to join the ride, using the information relating to the vehicle and provides a result of the determination to the in-vehicle terminal 10.

A radio signal from the in-vehicle terminal 10 is received by user terminals 20 located in a predetermined range, that is, a coverage of the radio signal. Conversely, a radio signal (e.g., a response) from a user terminal 20 is received by an in-vehicle terminal 10 located within a coverage of the radio signal. The coverage of a radio signal from an in-vehicle terminal 10 includes a range of direct reach of a radio signal transmitted from the in-vehicle terminal 10 and a range of propagation of the radio signal via one or more relay stations 3. Each relay station 3 is, for example, a repeater and forms a part of the network 2. A repeater receives a radio signal, reproduces an intensity and a waveform of the radio signal and retransmits the resulting radio signal. Interposition of the relay stations 3 enables an increase in distance of propagation (coverage) of a radio signal.

Alternatively, each relay station 3 may be an access point (AP) of a wireless LAN (local area network). In this case, the in-vehicle terminal 10 or a user terminal 20 transmits a connection request including an SSID (service set identifier), which is an identifier of an access point, to the AP. The in-vehicle terminal 10 or a user terminal 20 can transmit data to the opposite party of communication directly (not via a server) by connecting a wireless LAN and transmitting the data addressed to the opposite party of communication.

Note that a server 30 is connected to the network 2 (WAN). Each of the in-vehicle terminal 10 and the user terminals 20 can access the server 30 via the relay stations 3 and the network 2. The server 30 is an apparatus that manages information relating to the vehicle 1 used for ride-sharing, a driver of the vehicle and persons (users) who wish to join a ride in the vehicle 1 and for example, accumulates, e.g., past records of ride-sharing. Also, the server 30 can transmit (supply) information for assisting in direct communication between the in-vehicle terminal 10 and a user terminal 20 to the in-vehicle terminal 10 and the user terminal 20. Also, it is possible to cause operation of the in-vehicle terminal 10 to be performed under the control of the server 30.

The in-vehicle terminal 10 is a computer mounted in the vehicle 1, the computer communicating information relating to ride-sharing with a user terminal 20 and performing control of ride-sharing. The in-vehicle terminal 10 may be fixed (built) in the vehicle 1 or be detachably attached to the vehicle 1 and taken out to the outside of the vehicle as appropriate, or be a portable communication terminal merely placed at a predetermined position inside the vehicle 1. Also, the in-vehicle terminal 10 may be a dedicated terminal or a general-purpose terminal such as a smartphone or a personal computer.

Each of the user terminals 20 is, for example, a compact (portable) computer. Examples of the user terminals 20 include, e.g., smartphones, tablets computer, mobile computers, wearable computers, wireless storages, feature phones, handy terminals and laptop personal computers. Each of the user terminals 20 also may be a general-purpose computer or a dedicated computer as long as the user terminal 20 can perform favorable communication with the in-vehicle terminal 10.

In the information processing system according to the first embodiment, where a driver of the vehicle 1 can share a ride with another person, the in-vehicle terminal 10 transmits a radio signal of a ride-sharing offer notice (corresponding to "radio signal indicating that it is possible to share a ride") via broadcasting. A user terminal 20 that has received the radio signal of a ride-sharing offer notice transmits a response to the radio signal to the in-vehicle terminal 10 if the relevant user has made a setting indicating the user wishes to join a ride in the user terminal 20 or information indicating that the user wishes to join a ride has been input in the user terminal 20. Then, the user terminal 20 establishes a communication channel between the in-vehicle terminal 10 and the user terminal 20 and transmits/receives information provided for determination of a degree of matching between the vehicle side and the user side in relation to ride-sharing. As a result of the determination, if it is determined to share a ride with the user in the vehicle 1, information relating to a meeting point (pickup point) at which the driver of the vehicle 1 and the user meet is communicated between the in-vehicle terminal 10 and the user terminal 20 and each of the vehicle 1 and the user heads for the meeting point. Then, at the meeting point, the user rides in the vehicle 1 and travels to a point or a location designated by the driver or the user by the vehicle 1.

<Configuration of In-Vehicle Terminal>

Figure 2:
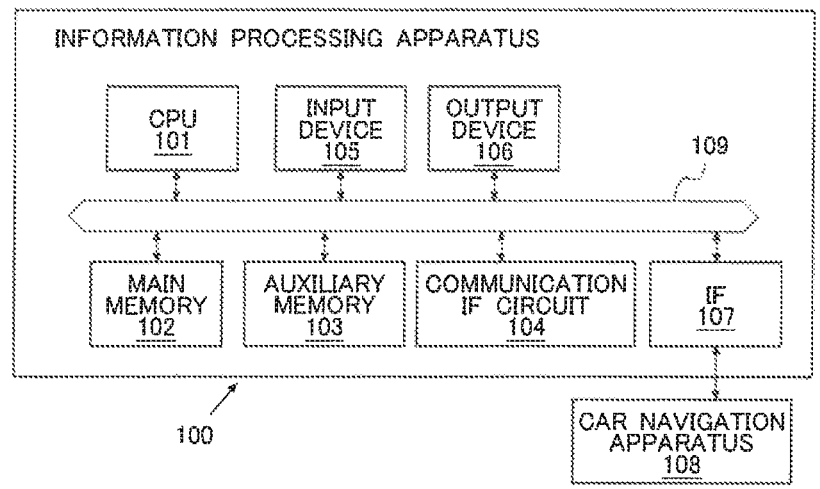
FIG. 2 illustrates an example configuration of an information processing apparatus that can be applied to an in-vehicle terminal 10.
Figure 3:
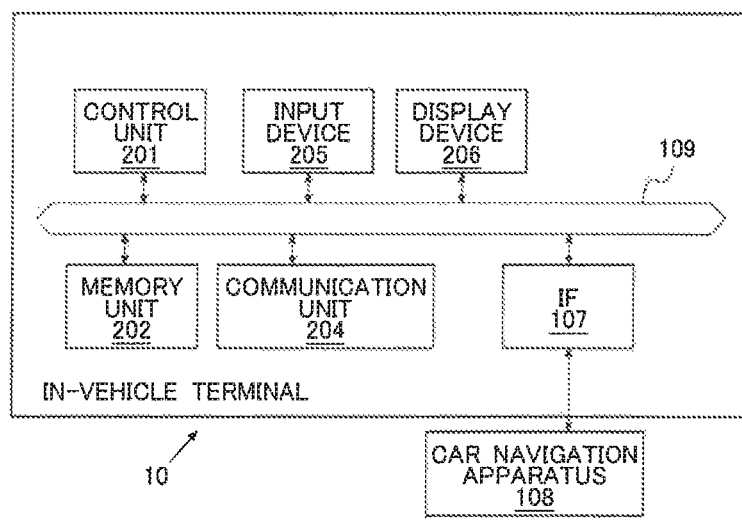
FIG. 3 illustrates an example configuration of an in-vehicle terminal.

FIG. 2 illustrates an example configuration of an information processing apparatus (computer) 100 that can be applied to the in-vehicle terminal 10. FIG. 3 illustrates an example configuration of the in-vehicle terminal 10. In FIG. 2, in the information processing apparatus 100, a CPU (central processing unit) 101, a main memory 102, an auxiliary memory 103, a communication interface circuit (communication IF circuit) 104, an input device 105 and an output device 106 are interconnected via a bus 109. The CPU 101 is an example of a processor and each of a main memory 102 and an auxiliary memory 103 is an example of a memory device.

The main memory includes a RAM (random access memory) and a ROM (read-only memory). The RAM is used as, e.g., a program loading area, a work area for the CPU 101 and a data storage area. The ROM stores various programs to be executed by the CPU 101 and data to be used in execution of the programs. The auxiliary memory 103 stores, e.g., programs and data to be used in execution of the programs. The auxiliary memory 103 is, for example, a hard disk drive (HDD).

The communication IF circuit 104 is a circuit that controls communication processing according to a RAT standard supported by the in-vehicle terminal 10. The communication IF circuit 104 includes a radio communication circuit for performing radio communication and is connected to an antenna. Although FIG. 2 illustrates a single communication IF circuit 104, where the in-vehicle terminal 10 performs radio communication based on two or more types of radio communication standards, a plurality of communication IF circuits 104 adapted to or complying with the respective radio communication standards are provided.

The input device 105 includes, e.g., keys, buttons, a pointing device and/or a touch panel to be used for input of information. Also, the output device 106 is used for output of information. The output device 106 includes, e.g., a display device and/or a printer. Also, the input device 105 may include an audio input device such as a microphone. The output device 106 may include an audio output device such as a speaker. As the audio input and output devices, for example, a headset may be used.

The CPU 101 performs various types of processing by loading programs stored in the main memory 102 or the auxiliary memory 103 and executing the programs. Upon execution of programs by the CPU 101, the information processing apparatus 100 operates as the in-vehicle terminal 10 including a control unit 201, a memory unit 202, a communication unit 204, an input device 205 and a display device 206 interconnected via a bus 109, which is illustrated in FIG. 3.

The CPU 101 operates as the control unit 201. The main memory 102 and the auxiliary memory 103 are used as the memory unit 202. The communication IF circuit 104 operates as the communication unit 204 (FIG. 3) and the input device 105 and the output device 106 are used as the input device 205 and the display device 206, respectively.

The control unit 201 performs, for example, the below operation or processing as processing for controlling ride-sharing using the vehicle 1:
(a) transmitting a radio signal indicating that it is possible to share a ride in the vehicle 1 (including a radio signal of a ride-sharing offer notice) via broadcasting;
(b) transmitting information relating to the vehicle 1 to a user terminal 20; and
(c) receiving information indicating a result of determination of whether or not a relevant user can join the ride in the vehicle 1, the determination being made using the information relating to the vehicle 1, from the user terminal 20.

Also, the information processing apparatus 100 is connected to a car navigation apparatus 108 mounted in the vehicle 1, via an interface circuit (IF) 107. The car navigation apparatus 108 includes, e.g., a CPU (processor), a memory device, a communication device, a GPS (global positioning system) receiver, an input device and a display device. Upon execution of a program stored in the memory device, the processor calculates a distance and a route to a destination and a length of time estimated to reach the destination, based on destination information input from the input device and a current position obtained from the GPS receiver, and causes the display device to display a map including the position of the vehicle 1. Also, together with the map, the car navigation apparatus 108 displays, e.g., the distance, the route and the estimated time. Also, upon the distance between the current position and the destination becoming shorter than a predetermined distance, the processor notifies the driver of the vehicle 1 of reaching an area near the destination by an audio output and/or a change in mode of display. In generation of information relating to the vehicle 1, the in-vehicle terminal 10 uses information obtained by the car navigation apparatus 108. Note that the in-vehicle terminal 10 may be provided by the car navigation apparatus 108 or an extension of an existing communication terminal mounted in the vehicle 1.

<Configuration of User Terminal>

Figure 4:
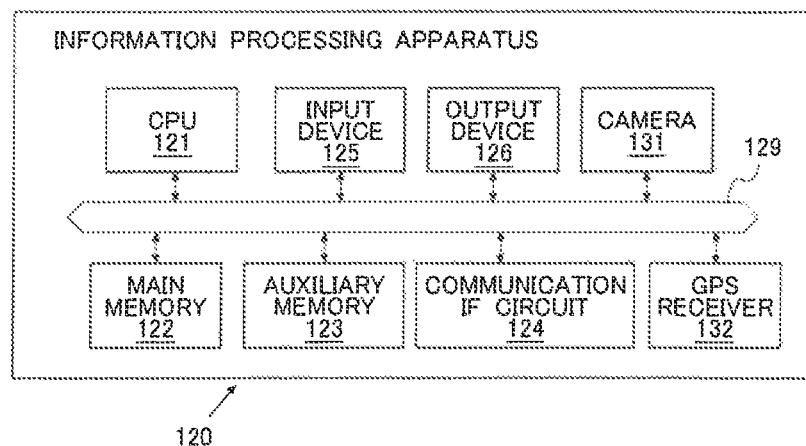
FIG. 4 illustrates an example configuration of an information processing apparatus that can be used as a user terminal.
Figure 5:
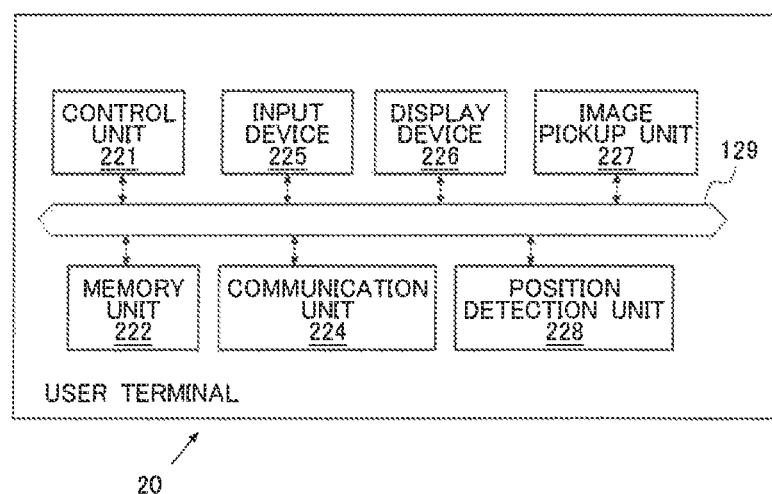
FIG. 5 illustrates an example configuration of a user terminal.

FIG. 4 illustrates an example configuration of an information processing apparatus 120 that can be used as a user terminal 20. FIG. 5 illustrates an example configuration of a user terminal 20. In FIG. 4, the information processing apparatus 120 has a configuration in which a CPU 121, a main memory 122, an auxiliary memory 123, a communication IF circuit 124, an input device 125 and an output device 126 are interconnected via a bus 129, which is similar to that of the information processing apparatus 100. A camera 131 and a GPS receiver 132 are further connected to the bus in the information processing apparatus 120. The camera 131 is used for, e.g., pickup of an image of a user of the user terminal 20. The GPS receiver 132 is used for detection of a position of the user terminal 20, that is, a current position of the user.

As illustrated in FIG. 5, in the information processing apparatus 120, the CPU 121 executes programs stored in the main memory 122 or the auxiliary memory 123. Consequently, the information processing apparatus 120 operates as a user terminal 20 including a control unit 221, a memory unit 222, a communication unit 224, an input device 225, a display device 226, an image pickup unit 227 and a position detection unit 228. In other words, the CPU 121 operates as the control unit 221. The main memory 122 and the auxiliary memory 123 are used as the memory unit 222. Also, the communication IF circuit 124 operates as the communication unit 224. Also, the input device 125 and the output device 126 are used as the input device 225 and the display device 226, respectively. Also, the camera 131 operates as the image pickup unit 227 and the GPS receiver 132 operates as the position detection unit 228.

The control unit 221 performs the below operation or processing as processing for assisting in determination of a vehicle in which the user of the user terminal 20, the user wishing to join a ride, joins a ride:

(A) receiving a radio signal indicating that it is possible to share a ride in the vehicle 1 from the in-vehicle terminal 10;

(B) if the user of the user terminal 20 wishes to join the ride (for example, has performed an input indicating that the user wishes to join a ride), transmitting a response to the signal to the in-vehicle terminal 10 and receiving information relating to the vehicle 1 from the in-vehicle terminal 10; and (C) generating information indicating a result of determination of whether or not the user can join the ride in the vehicle 1, the determination being made using the information relating to the vehicle 1, and transmitting the information to the in-vehicle terminal 10.

<Vehicle-Related Information>

Next, vehicle-related information, which is the information relating to the vehicle 1, will be described. The vehicle-related information is used for determination of a degree of matching between a vehicle and a user (person who wishes to join a ride). FIG. 6A is a diagram of the vehicle-related information. The vehicle-related information includes a plurality of information pieces of different categories, an information piece of each category includes information elements corresponding to predetermined information items. In the present embodiment, the vehicle-related information includes destination information, vehicle attribute information, driver attribute information and ride-sharing condition information as a plurality of information pieces of different types. The vehicle-related information is stored in the memory unit 202 in association with a predetermined identifier (for example, a vehicle ID). The vehicle-related information may be stored in advance in the memory unit 202 before establishment of a communication channel or may be acquired after establishment of a communication channel. The vehicle-related information may be acquired from the outside of the in-vehicle terminal 10 (for example, the server 30) by the communication unit 204.

The destination information is information indicating a destination of the vehicle 1. As the destination information, for example, a destination set in the car navigation apparatus 108 is acquired by the control unit 201 and the destination or an area belonging to the destination (for example, a local public entity) is acquired as the destination information. It is possible that if no destination is set, the control unit 201 notifies the driver of information for urging setting of a destination to make the driver to set a destination. Also, the control unit 201 may urge the driver to input destination information using the input device 205 rather than operation of the car navigation apparatus 108, to acquire the destination information. The destination information may include information on a point on the route to the destination in addition to the final destination.

The vehicle attribute information is information indicating attributes of the vehicle 1. Examples of information items (attributes of the vehicle) of the vehicle attribute information include a vehicle type (e.g., a sedan, a minivan, a van, a truck, a minicar or an eco-car) and whether or not the vehicle has a space for luggage (e.g., a loading platform or a trunk). The vehicle attribute information may include image information relating to the vehicle 1. The image information may be an image taken of the vehicle 1 using, e.g., the image pickup unit 227 or an image of a vehicle of a type that is the same as or similar to the vehicle 1 for reference. Also, the attributes of the vehicle may include whether or not there is another fellow passenger (occupant other than the driver).

The driver attribute information is information indicating attributes of the driver of the vehicle 1. Examples of information items (attributes of the driver) in the driver attribute information include, e.g., the gender, the age and the occupation of the driver. The driver attributes may include a race or a language. If there is a fellow passenger other than the person who wishes to join the ride, attributes of such fellow passenger may be included in the driver attribute information.

The ride-sharing condition information is information indicating ride-sharing conditions other than the vehicle attribute information and the driver attribute information. The ride-sharing conditions include information indicating attributes (the gender and the age) of a user allowed to join the ride by the driver of the vehicle 1. Also, the ride-sharing conditions include, e.g., a ride fare range (from a lower limit to an upper limit), whether or not the user shares the ride with a fellow passenger other than the driver, whether or not the user allows a person who shares the ride to designate a point at which the person gets out of the vehicle and luggage size and weight limits. Note that the contents of the attribute information and the ride-sharing condition information are not limited to the above-indicated examples.

<User-Related Information>

Next, user-related information, which is information relating to a user will be described. FIG. 6B is a diagram of user-related information. The user-related information includes a plurality of information pieces of different categories (information pieces of a plurality of categories), and an information piece of each category includes information pieces corresponding to one or more information items. In the present embodiment, the user-related information includes destination information indicating a destination of the user, user attribute information and user request information. The user-related information is, for example, stored (registered) in the memory unit 222, in association with a user ID, which is identification information for the user, in advance (before establishment of a communication channel). However, the user-related information may be one stored in the memory unit 222 after establishment of a communication channel. The user-related information is acquired by an input using the input device 225 or communication using the communication unit 224.

The destination information of the user corresponds to the destination information in the vehicle-related information. The destination is, e.g., a location name, a facility name or an address of the destination or a name of an area the destination belongs to (e.g., a local public entity) or coordinates of a position of the destination. The destination information has a form that enables comparison with the destination information of the vehicle 1 (form that enables determination of whether or not the destination of the user is the same as the destination of the vehicle or is located at a point on the route to the destination). The user attribute information is information indicating, e.g., the gender, the age, the occupation, the race and the language of the user and whether or not the user carries luggage and the size of the luggage. The user attribute information is used as determination information for the in-vehicle terminal 10 to determine whether or not the user is allowed to join the ride. The user attribute information includes information on an image of the user. The information on the image of the user may be one taken and stored in advance or one taken by the user using the image pickup unit 227 for transmission of the user-related information to the in-vehicle terminal 10.

The user request information is information indicating requests of the user, the requests relating to ride-sharing, and is information indicating requests of the user, the requests relating to driver attribute information and ride-sharing condition information in vehicle-related information. For example, the user request information includes, e.g., attributes of a vehicle 1, attributes of a driver of a vehicle 1, an amount payable as a fare, whether or not the user can join a ride with a fellow passenger other than the driver, whether or not the user wishes designation of a point at which a person who shares the ride gets out of the vehicle and a size of luggage to be loaded. However, neither the user attribute information nor the user request information is limited to these examples.

<Example Operation>

Figure 7:
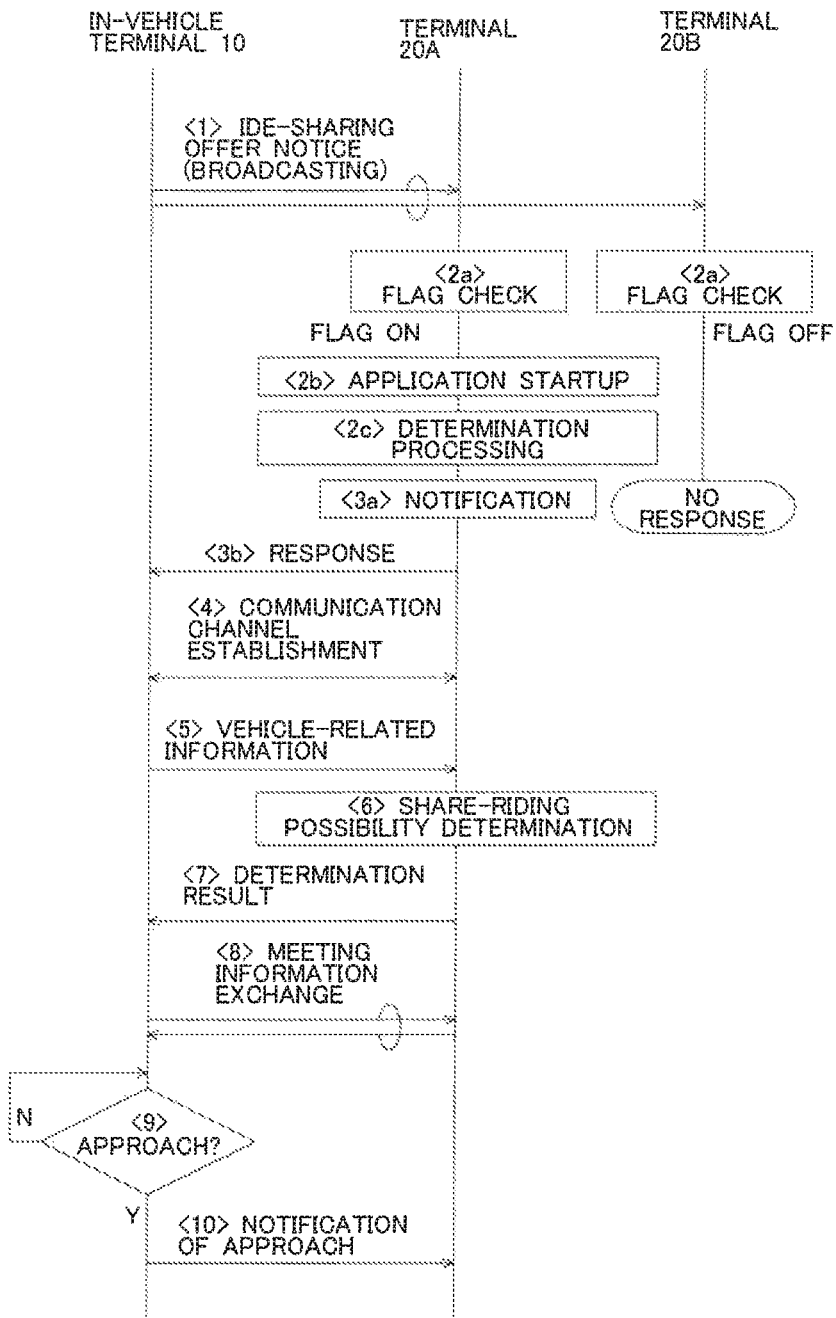
FIG. 7 is a sequence diagram illustrating an example operation in an information processing system.

FIG. 7 is a sequence diagram illustrating an example operation in the information processing system. Where the driver of the vehicle 1 can (may) share a ride with another person, the driver operates the in-vehicle terminal 10 to start an application program for ride-sharing control, the application program being installed in the in-vehicle terminal 10. The driver inputs information indicating that it is possible to share a ride to the in-vehicle terminal 10. The input is performed by, e.g., an input or a voice input using the input device 205 (input device 105) of the in-vehicle terminal 10.

In response to the input, the control unit 201 (CPU 101) of the in-vehicle terminal 10 performs processing for transmitting a radio signal including a ride-sharing offer notice (corresponding to a "signal indicating that it is possible to share a ride in the vehicle"), which is based on a predetermined radio communication standard, from the communication unit 204 (FIG. 7<1>). The communication unit 204 transmits the ride-sharing offer notice via broadcasting. This is because at the current stage, no person (user) who joins the ride has been determined and thus a ride-sharing offer notice is delivered to user terminals 20 of users that can be fellow passenger candidates.

Setting of broadcasting is made by setting a broadcasting address as an address of a destination of a radio signal. Upon detection of the broadcasting address, each user terminal 20 handles the radio signal as one addressed to the relevant terminal. In other words, each user terminal 20 receives (loads) the ride-sharing offer notice.

In the first embodiment, as information included in the ride-sharing offer notice, the information forming a part of vehicle-related information (first information), destination information in the information relating to the vehicle is included. For example, in response to the aforementioned input of information indicating that it is possible to share a ride, the control unit 201 acquires information indicating a currently-set destination from the car navigation apparatus 108, as destination information and causes the information to be included in the ride-sharing offer notice.

However, the first information may be information other than destination information and may include at least one of vehicle attribute information, driver attribute information and ride-sharing condition information in addition to destination information. The control unit 221 of the user terminal 20 that has received the radio signal of the ride-sharing offer notice determines whether or not user request information the user terminal 20 has matches the first information.

The radio signal of the ride-sharing offer notice, the radio signal being transmitted from the communication unit 204 of the in-vehicle terminal 10, is received by each of a plurality of user terminals 20 that are located within a coverage of the radio signal (radio waves) and can receive the radio signal. In the present embodiment, a case where as an example of the plurality of user terminals 20, the user terminal 20A of user A and the user terminal 20B of user B have received a radio signal of a ride-sharing offer notice will be described.

Upon acquisition of a ride-sharing offer notice, the notice being received by the communication unit 224 of each of the user terminal 20A and the user terminal 20B, the relevant control unit 221 checks a flag relating to ride-sharing control (FIG. 7<2a>). The flag relating to ride-sharing control is a flag indicating whether or not to start an application program for ride-sharing control (ride-sharing control application), the application program being installed in the user terminal 20, and is stored in the memory unit 222. If a user of a user terminal 20 wishes to join a ride, the flag is set to be on and if a user of a user terminal 20 does not wish to join a ride, the flag is set to be off. Control of setting the flag to be on/off is performed using, for example, the input device 225.

If the flag is off, the control unit 221 ignores the ride-sharing offer notice and performs no specific processing. In the example illustrated in FIG. 7, in the user terminal 20B, the flag is off and the ride-sharing offer notice is ignored. Consequently, no response to the ride-sharing offer notice is transmitted from the user terminal 20B. On the other hand, if the flag is on, the control unit 201 starts (starts execution of) the ride-sharing control application. In the example illustrated in FIG. 7, the flag in the user terminal 20A is on and the ride-sharing control application is stared (FIG. 7<2b>).

Use of the flag enables avoidance of needless startup of the ride-sharing control application and thus enables avoidance of waste of power and resources (resources of the CPU and the memories). Here, use of the flag relating to ride-sharing control is an option. If no flag is set, a configuration in which upon reception of a ride-sharing offer notice, the control unit 221 automatically starts execution of the ride-sharing control application may be employed.

Upon startup of the ride-sharing control application, the control unit 221 of the user terminal 20A compares the destination information of the vehicle 1 (corresponding to first information), the destination information being included in the ride-sharing offer notice, destination information of the user of the user terminal 20A (corresponding to user request information), the destination information being stored in the memory unit 222, with each other to perform determination processing for determining whether or not the destination information of the vehicle 1 and the destination information of the user match each other (FIG. 7<2c>).

If the destination information indicates that the destination of the user corresponds to the destination of the vehicle or a point on a route to the destination of the vehicle, the control unit 221 determines that the destination of the vehicle 1 and the destination of the user match each other. Here, if the control unit 221 determines that the destination of the vehicle 1 and the destination of the user do not match each other, the control unit 221 terminates the ride-sharing control application and makes no response to the ride-sharing offer notice. As described above, if the destination of the user and the destination of the vehicle 1 do not match each other, the control unit 221 avoids a communication channel between the relevant user terminal and the vehicle 1 and terminates the ride-sharing control application to save power and reduce a load.

If it is determined that the destination of the vehicle 1 and the destination of the user match each other, the control unit 221 notifies the user of the information indicating that it is possible to share a ride, the information being included in the ride-sharing offer notice (FIG. 7<3a>). For example, the statement "ride-sharable vehicle exists" is displayed on the display device 206 or a voice of "ride-sharable vehicle exists" is output from a speaker. However, the manner of the notification is not limited to the above. In the present embodiment, the notification is provided by displaying the information indicating that it is possible to join a ride on the display device 226 via push notification. The notification enables the user of the user terminal 20A to know that there is a vehicle 1 in which the user can join a ride (seeking a person with which a ride is shared).

Upon knowing of the information indicating that it is possible to share a ride, the user of the user terminal 20A determines whether or not to respond to the ride-sharing offer notice and inputs a result of the determination using the input device 225. Here, upon an input to the effect that no response is made being performed, the control unit 221 of the user terminal 20 terminates the ride-sharing control application to avoid a procedure for establishing a communication channel (not to establish a communication channel). This is intended to save power and labor. On the other hand, upon an input to the effect that a response is made being performed, the control unit 221 transmits a response to the ride-sharing offer notice to the in-vehicle terminal 10 (FIG. 7<3b>). The response is addressed and transmitted to the in-vehicle terminal 10 using, for example, an address of the in-vehicle terminal 10 included in the ride-sharing offer notice. The response includes an address of the user terminal 20 and thereafter, the in-vehicle terminal 10 and the user terminal 20 communicate with each other with the opposite-side addresses set as respective destinations. The response corresponds to a "signal indicating that the user wishes to join the ride". Note that a configuration in which a setting of the flag to be on is regarded as an input of an intension of the user to wish to join a ride to omit an input of a result of determination of whether or not to respond to the ride-sharing offer notice and if it is determined that the destination (first information) of the vehicle 1 matches the destination (user request information) of the user, the control unit 221 automatically transmits a response may be employed.

The control unit 221 performs a connection procedure (handshake) with the in-vehicle terminal 10 based on a predetermined radio communication standard to establish a communication channel with the in-vehicle terminal 10 (FIG. 7<4>). Consequently, a communication channel for peer-to-peer communication is established between the in-vehicle terminal 10 and the user terminal 20. In the example illustrated in FIG. 7, a radio signal of a response (FIG. 7<3b>) and communication channel establishment (FIG. 7<4>) are indicated as separate communications; however, the "response" in FIG. 7<3b> may be a message (signal) transmitted from the user terminal 20 to the in-vehicle terminal 10 for communication channel establishment. At the time of response transmission/reception and communication channel establishment, a vehicle ID of the vehicle 1 and a user ID of the user of the user terminal 20 are exchanged mutually, associated with the in-vehicle terminal 10 and the user terminal 20, respectively, and stored in the respective memory units 202, 222. These IDs are included in data and information communicated thereafter. Note that instead of the vehicle ID, an ID of the in-vehicle terminal 10 may be used and instead of the user ID, an ID of the user terminal 20 may be used.

In the example illustrated in FIG. 7, a case where the user terminal 20A transmits a response to the in-vehicle terminal 10 and the control unit 221 executes a procedure for establishing a communication channel between the user terminal 20A and the in-vehicle terminal 10 jointly with the control unit 201 of the in-vehicle terminal 10 is indicated. The establishment of the communication channel is performed by means of, e.g., establishment of connection using an SSID in a wireless LAN (WiFi) or pairing in Bluetooth (registered trademark).

Upon establishment of the communication channel, the control unit 201 of the in-vehicle terminal 10 acquires the vehicle ID and the vehicle-related information from the memory unit 202 and transmits the vehicle ID and the vehicle-related information to the user terminal 20 (user terminal 20A) using the communication channel (FIG. 7<5>). The vehicle-related information transmitted here includes the vehicle attribute information, the driver attribute information and the ride-sharing condition information other than the destination information and thus corresponds to "remaining information in the information relating to the vehicle". However, where a configuration in which a user can recognize the destination of the vehicle 1 by means of display or voice output of destination information is employed, the destination information may be included at this point of time. This is because the user may recognize the destination of the vehicle 1 and possibly join the ride although the destination is different from the destination of the user.

Figure 8:
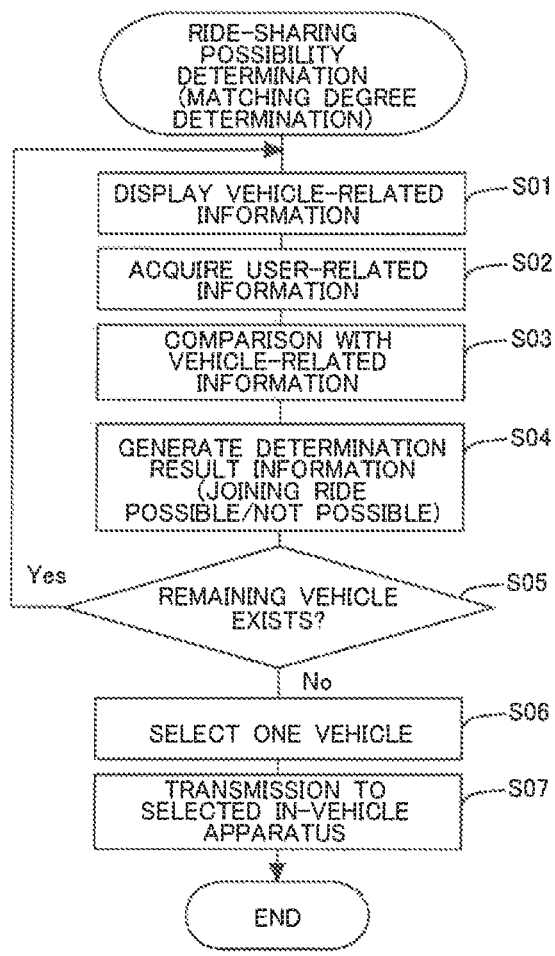
FIG. 8 is a flowchart illustrating ride-sharing possibility determination processing in a user terminal.

Upon reception of the vehicle-related information, the control unit 221 of the user terminal 20A performs ride-sharing possibility determination processing (FIG. 7<6>). FIG. 8 is a flowchart illustrating an example of ride-sharing possibility determination processing in a user terminal. The ride-sharing possibility determination processing is processing for determination of a degree of matching between the vehicle 1 and a person who wishes to join a ride (user) (also referred to as matching processing).

In the processing in S01, the control unit 221 displays the vehicle-related information received by the communication unit 224, on the display device 226. However, the display is optional and the vehicle-related information may be able to be displayed on the display device 226 at a proper timing in response to an operation performed by the user.

In S02, the control unit 221 acquires the user ID and user-related information (user attribute information and user request information) of the user of the user terminal 20A from, e.g., the memory unit 222. The user may be caused to input user-related information using the input device 225 at this point of time.

The control unit 221 acquires the user-related information from, e.g., the memory unit 222 or the input device 225. Then, the control unit 221 compares the user-related information with the vehicle-related information (the vehicle attribute information, the driver attribute information and the ride-sharing condition information) to determine whether or not the user request information and the vehicle-related information match each other (whether or not the user and the vehicle match each other) (S03).

In S03, the control unit 221 determines whether or not the vehicle attribute information, the driver attribute information and the ride-sharing condition information match the user request information and the user attribute information. In other words, the control unit 221 compares information pieces corresponding to respective information items in the user attribute information and the user request information with corresponding information pieces in the vehicle attribute information, the driver attribute information and the ride-sharing condition information to determine whether or not the respective information pieces match each other. For example, the control unit 221 determines whether or not, e.g., a type of the vehicle 1, the gender and the age of the driver and a ride fare match requests of the user, which are included in the user-related information.

The control unit 221 calculates a rate of coincidence of the user attribute information and the user request information with the vehicle attribute information, the driver attribute information and the ride-sharing condition information after the determination processing for the respective information items. The rate of coincidence may be calculated according to, for example, the expression "the number of matched information items/the total number of information items". Alternatively, the rate of coincidence may be an average value of degrees of coincidence (discrepancy) between contents of the respective information items and the user's requests. The method for calculation of the rate of coincidence is not limited to the above examples. If the rate of coincidence exceeds a predetermined threshold value, the control unit 221 determines that the contents of the information items match the user's requests and if the rate of coincidence does not exceed the predetermined threshold value, determine that the contents of the information items do not match the user's requests. Then, the control unit 221 causes the processing to proceed to S04.

However, the control unit 221 may display the rate of coincidence on the display device 226 and cause the user to input a result of determination of whether or not the contents of the information items match the user's requests via the input device 225. In this case, as appropriate, coincidence/non-coincidence of the user attribute information and the user request information with the vehicle attribute information, the driver attribute information and the ride-sharing condition information may be displayed on the display device 226.

Also, in the processing in S03, the vehicle attribute information, the driver attribute information and the ride-sharing condition information, and the user attribute information and the user request information may be displayed on the display device 226 to allow the user to visually determine whether or not the vehicle attributes, the driver attributes and the ride-sharing conditions match the user attributes and requests and input a result of the determination using the input device 225. In this case, if information to the effect that they match each other or information to the effect that they do not match each other is input, the control unit 221 causes the processing to proceed to S04.

In S04, the control unit 221 generates determination result information indicating that it is possible or not possible to join the ride. If the result in S03 is "they do not match each other", the control unit 221 generates determination result information indicating that it is not possible to join the ride. On the other hand, if the result in S03 is "they match each other", the control unit 221 generates determination result information indicating that it is possible to join the ride.

In S05, the control unit 221 determines whether or not a remaining vehicle exists. The processing in S05 and S06 is processing to be performed where in-vehicle terminals 10 of a plurality of vehicles 1 are connected (establish respective communication channels) in parallel to one user terminal 20 and vehicle-related information is received from each in-vehicle terminal 10.

The user terminal 20 can be subjected to the following settings. When a ride-sharing offer notice is received from a certain in-vehicle terminal 10, if a communication channel with an in-vehicle terminal 10 of another vehicle 1 has been established, the user terminal 20 ignores the ride-sharing offer notice. In other words, the user terminal 20 can narrow down vehicles 1 with which a communication channel is established to one.

Also, where a user terminal 20 has received radio signals of a ride-sharing offer notice from a plurality of vehicles 1, a destination of each of the plurality of vehicles 1 matching that of the user terminal 20 (no communication channel has been established), the user terminal 20 may select one vehicle 1 (in-vehicle terminal 10) according to a predetermined rule and establish a communication channel with the selected in-vehicle terminal 10. The predetermined rule is, e.g., an order of earliness of a time of detection of the radio signal or a descending order of radio wave intensity.

However, it is also possible to make a setting so that communication channels with the plurality of in-vehicle terminals 10 are established in parallel with an upper limit provided. In this case, communication channels with a number of in-vehicle terminals 10, the number being equal to or below an upper limit number, are established (operation in <2a> to <4> in FIG. 7 is performed for each ride-sharing offer notice) and respective vehicle-related information pieces can be received from the respective in-vehicle terminals 10 using the respective communication channels. In this case, the control unit 221 can perform processing in S01 to S04 for each of the respective vehicle-related information pieces from the respective in-vehicle terminals 10 and determine whether or not the vehicle-related information piece matches the user's requests for each vehicle 1.

In S05, the control unit 221 determines whether or not there is a vehicle-related information piece from a remaining vehicle. If the processing in S01 to S04 has been performed for the vehicle-related information pieces from the plurality of in-vehicle terminals 10 with which a communication channel has been established or if there is just one in-vehicle terminal 10 with which a communication channel has been established, the processing proceeds to S06. Otherwise, the processing returns to S01 and the processing in S01 to S04 is performed for the remaining vehicle-related information piece.

In S06, the control unit 221 selects (identifies) one vehicle 1 in which the user joins a ride from among the plurality of vehicles 1 (in-vehicle terminals 10). Here, if there is just one vehicle 1, for which a determination result that "the relevant vehicle 1 match the user's requests" (referred to as "matched vehicle"), the control unit 221 selects the matched vehicle. On the other hand, if there are two or more matched vehicles, the control unit 221 selects one of the plurality of matched vehicles according to a predetermined selection rule. For example, rates of coincidence between user attribute information and user request information, and vehicle-related information (vehicle attribute information, driver attribute information and ride-sharing condition information) of the matched vehicles are compared with each other and a matched vehicle, the rate of coincidence of which is largest, is selected. Alternatively, a predetermined number of information items from a plurality of information items included in user request information and user attribute information are extracted and a vehicle 1, the rate of coincidence between the extracted information items and vehicle-related information of the vehicle 1 being largest, may be selected. The control unit 221 may automatically performs the selection according to a predetermined rule. Also, the control unit 221 may select a vehicle 1 that is a result of selection by the user inputting the result of selection via the input device 225 with reference to results of ride possibility determination (e.g., the rate of coincidence) for the vehicles 1, the results being displayed on the display device 226.

In S07, the control unit 221 transmits the result of the ride possibility determination to the in-vehicle terminal 10 of the vehicle 1 selected in S06, using the relevant communication channel. Here, the determination result of "it is possible to join the ride" indicates that the user joins the ride in the vehicle 1 and the determination result of "it is not possible to join the ride" indicates that the user does not join the ride. However, if the result of the determination in S06 is that there is no matched vehicle, information indicating that "it is not possible to join the ride" is transmitted to the respective in-vehicle terminals 10.

Note that no result of determination may be transmitted to the in-vehicle terminals 10 not determined as a matched vehicle. The control unit 201 in each in-vehicle terminal 10 sets a timer for waiting a determination result at the time of transmission of the vehicle-related information. If the time is up on the timer without reception of a determination result, the control unit 201 disconnects the communication channel and terminates the processing relating to the ride-sharing control. Note that if the user does not join a ride in any of the vehicles 1 even though the vehicles 1 are matched vehicles, the user can perform an input to the effect that the user does not join a ride. In this case, the control unit 201 transmits no determination result to the respective in-vehicle terminals 10. As a result, the communication channels are disconnected, and the processing ends.

The control unit 201 of the in-vehicle terminal 10 receives the information indicating the result of the ride possibility determination using the vehicle-related information, from the user terminal 20A (FIG. 7<7>). Then, the control unit 201 determines that the user of the user terminal 20A joins the ride in the vehicle 1. In this case, information for assisting in the driver finding the user or the user finding the vehicle 1 (assistance information; also referred to as meeting information) is exchanged (transmitted and received) between the in-vehicle terminal 10 and the user terminal 20A (FIG. 7<8>). The transmission and reception are performed using the above-described communication channel.

Figure 9:
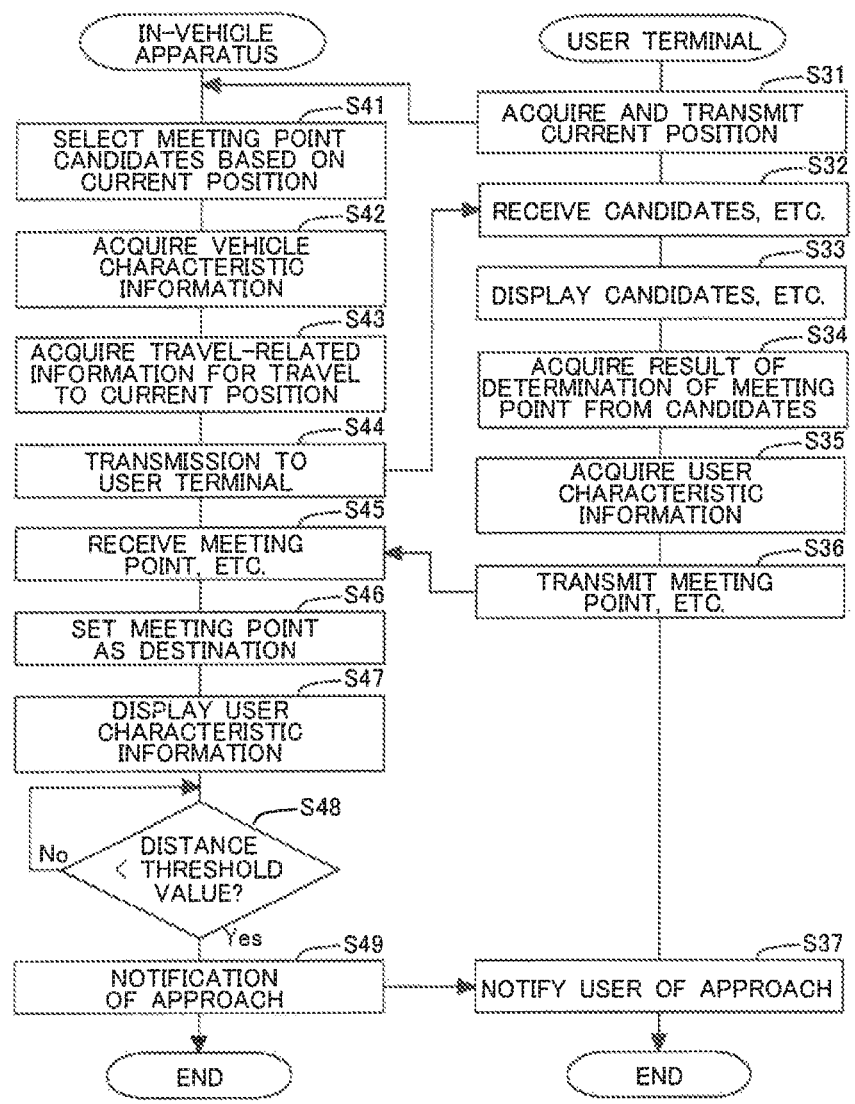
FIG. 9 is a flowchart illustrating example processing relating to an exchange of meeting information.

FIG. 9 is a flowchart illustrating example processing for exchange of meeting information. For example, the control unit 221 in the user terminal 20A acquires information indicating a current position of the user terminal 20A from the position detection unit 228 (GPS receiver 112) and transmits the information to the in-vehicle terminal 10 (S31).

The control unit 201 in the in-vehicle terminal 10 selects meeting point candidates using the information indicating the current position of the user terminal 20A (S41). In the memory unit 202, information indicating a plurality of locations at which the vehicle 1 can be parked, which can be used for meeting with the user, is stored. Upon acquisition of the current position, the control unit 201 selects a predetermined number of (for example, one to three; the number may be three or more) locations at which the vehicle 1 can be parked, according to a predetermined rule and determines the locations as meeting point candidates. For example, the control unit 201 extracts locations at which the vehicle 1 can be parked, a direct distance to each location from the current position being shorter than a predetermined distance, and selects a predetermined number of such locations in ascending order of distance from the current position. Alternatively, the control unit 201 may select a predetermined number of locations at which the vehicle 1 can be parked in order of earliness of an estimated time of reach of the vehicle 1. Also, the control unit 201 may select a predetermined number of locations at which the vehicle 1 can be parked, based on the direct distances from the current position of the vehicle 1 and the estimated times of reach. For selection of locations at which the vehicle 1 can be parked, a speed and a direction of travel of the user may be taken into consideration.

Note that locations at which the vehicle 1 can be parked are locations at which the driver can stop or park the vehicle 1 in order for the user to ride in the vehicle 1, such as, for example, a parking lot of a roadside station, a parking lot of a predetermined shop or facility (e.g., a convenience store, a vehicle dealership or a vehicle maintenance shop) or a vacant lot.

The control unit 201 determines the predetermined number of locations at which the vehicle 1 can be parked as meeting point candidates and transmits the meeting point candidates to the user terminal 20A (S44). Prior to the transmission, the control unit 201 may perform processing for acquiring information indicating outer appearance characteristics of the vehicle 1 (referred to as "characteristic information") as information to be transmitted to the user terminal 20A together with the meeting point candidates (S42). The characteristic information may be a text or an image indicating the characteristics or an image (photo) of the vehicle 1. The control unit 201 acquires the characteristic information by reading the information from the memory unit 202 or inputting the information from the input device 205.

Also, the control unit 201 may perform processing for acquiring travel-related information relating to travel to the current position as information to be transmitted to the user terminal 20A together with the meeting point candidates (S43). The travel-related information can be acquired, for example, as follows. The control unit 201 gives the current position to the car navigation apparatus 108 as a destination and acquires a calculation result (information indicating, e.g., a travel route and a distance to the current position and a time to be taken to reach the current position) from the car navigation apparatus 108 as travel-related information relating to travel to the current position (destination). The travel-related information serves as information roughly indicating, e.g., a length of time to be taken for the vehicle 1 to travel to the current position, to the user. Note that the order of S42 and S43 may be reversed.

The control unit 221 in the user terminal 20A receives the meeting point candidates, the information on characteristics of the vehicle 1 and the travel-related information relating to travel to the current position (S32). Then, the control unit 221 causes these information pieces to be displayed on the display device 226 (S33). The user inputs a result of determination of a meeting point from among the candidates with reference to the content of the display on the display device 226. The control unit 221 acquires the result of the determination (S34). Also, the characteristic information of the vehicle 1 is stored in the memory unit 222 as information for assisting in finding the vehicle 1. The characteristic information of the vehicle 1 can be displayed on the display device 226 as appropriate. Furthermore, the travel-related information for travel to the current position is taken into consideration in order to determine, e.g., a pace of travel to the meeting point.

The control unit 221 transmits the result of the determination of the meeting point to the in-vehicle terminal 10 (S36). Prior to the transmission, the control unit 221 may acquire information indicating characteristics of the user as information to be transmitted to the in-vehicle terminal 10 together with the result of the determination (S35). Example of the user characteristic information include, e.g., information indicating the cloth and items (headwear, a bag and an accessory) the user is currently wearing, information indicating colors of the cloth and the items and a text and an image (photo) indicating the cloth and the items the user is currently wearing. The user characteristic information can be acquired by reading the information from the memory unit 222, causing the user to input the information from the input device 225 or taking the image using the image pickup unit 227. Note that the processing in S35 can be performed before the processing in S33 and S34.

Upon reception of the result of the determination of the meeting point and the user characteristic information (S45), the control unit 201 transmits the meeting point to the car navigation apparatus 108. The car navigation apparatus 108 sets the meeting point as a destination (S46). The driver starts traveling (driving) to the meeting point according to an instruction from the car navigation apparatus 108. Also, the information indicating characteristics of the user is displayed on the display device 226 (S47) and used as a clue in the driver finding the user.

Subsequently, the control unit 201 occasionally acquires a current position of the vehicle 1 (corresponding to a current position of in-vehicle terminal 10) calculated by the car navigation apparatus 108 and the current position of the user terminal 20 received from the user terminal 20. The control unit 201 determines whether or not a distance between the current position of the vehicle 1 and the current position of the user terminal 20 becomes less than a predetermined threshold value (S48, FIG. 7<9>). If the distance becomes less than the predetermined threshold value (predetermined value) (Yes in S48), the control unit 201 provides (transmits) a notice of information indicating the approach of the vehicle 1 to the user terminal 20A (S49, FIG. 7<10>). The notice may include some sort of message to the user. The message may include, e.g., information indicating a point to which the driver wishes the user to move for smooth pickup and information indicating an action to be performed by the driver from then. Also, instead of the distance between the current positions described above, a distance between the vehicle 1 (in-vehicle terminal 10) and the meeting point or the distance between the user terminal 20 and the meeting point may be used.

In the user terminal 20A, upon reception of the information indicating the approach, the control unit 221 notifies the user of the approach of the vehicle 1 (S37). The notification is provided by display on the display device 226 and/or an audio output. Here, in the processing in S49, voice communication between the driver and the user may be performed by transmission/reception of voice packets between the in-vehicle terminal 10 and the user terminal 20A using the communication channel. The voice communication enables detailed coordination for pickup.

The processing in S48 and S49 can be performed in the user terminal 20A. The distance used for determination in this case may be a distance between the user terminal 20 and the vehicle 1 (in-vehicle terminal 10) or a distance between the user terminal 20 or the in-vehicle terminal 10 and the meeting point.

<Accumulation, Etc., of Past Records, Etc.>

The information processing system illustrated in FIG. 1 includes the server 30. The server 30 has, for example, a configuration in which the CPU 101, the main memory 102, the auxiliary memory 103 and the communication IF circuit 104 are interconnected via the bus 109, which is illustrated in FIG. 2.

The user terminal 20 (for example, the user terminal 20A) of the user that has joined a ride in the vehicle 1, for example, after an end of the processing in FIG. 9, accesses the server 30 and transmits ride-sharing record information automatically or in response to an operation performed by the user. The ride-sharing record information can include the below information. Also, the in-vehicle terminal 10 transmits information held in the relevant terminal in the below information to the server 30 after the processing in FIG. 9:

(i) the user ID (or the ID of the user terminal) and the vehicle ID (or the ID of the in-vehicle terminal);
(ii) the date of the ride-sharing;
(iii) the vehicle-related information and the user-related information;
(iv) the result of processing for matching the vehicle-related information and the user-related information with each other, a rate of coincidence between the vehicle-related information and the user-related information, etc.;
(v) the meeting point; and
(vi) the communication log.

In the server 30, the communication IF circuit 104 receives the ride-sharing record information and provides the ride-sharing record information to the CPU 101. The CPU 101 stores the ride-sharing record information in a memory device (the main memory 102 or the auxiliary memory 103). In the memory device in the server 30, a plurality of ride-sharing record information pieces are accumulated. Such record information pieces are used for analysis of a tendency of the user's selection and the user's preferences.

Also, the server 30 can store the vehicle-related information and/or the user-related information in the memory device in response to a request from the in-vehicle terminal 10 and/or the user terminal 20. In this case, the server 30 manages the vehicle-related information and the user-related information using the vehicle ID or the user ID or a combination of the vehicle ID and the user ID. In response to an information provision request including the vehicle ID and/or the user ID, the server 30 transmits the vehicle-related information and/or the user-related information to the in-vehicle terminal 10 and/or the user terminal 20 that are a source of the request. Consequently, the in-vehicle terminal 10 can obtain the vehicle-related information from the server 30 and transmit the vehicle-related information to the user terminal 20 and the user terminal 20 can acquire the user-related information from the server 30 for comparison with the vehicle-related information. As described above, the server 30 can be used as a backup destination of the vehicle-related information and the user-related information.

Also, the server 30 can perform, for example, the following operation. Upon the flag in a user terminal 20 being set to be on, notification of the flag being on is provided to the server 30. The server 30 transmits a ride-sharing offer notice transmission instruction to in-vehicle terminals 10 of vehicles 1 registered in the server 30 according to the number of user terminals 20 with the respective flags on. Each in-vehicle terminal 10 has an acceptance possibility flag indicating whether or not it is possible to accept the transmission instruction, and if the acceptance possibility flag is on (acceptance is possible) at the time of reception of the transmission instruction, the relevant control unit 201 transmits a radio signal of a ride-sharing offer notice. If the acceptance possibility flag is off, the control unit 201 ignores the transmission instruction or provides a message indicating "a person who wishes to join a ride exists" to the driver using the display device 226 or the speaker. Consequently, if the driver can share a ride, the driver performs an input for transmitting a ride-sharing offer notice. The acceptance possibility flag can be set by the driver of the vehicle 1.

Effects of First Embodiment

In the information processing system according to the first embodiment, if the driver of the in-vehicle terminal 10 mounted in the vehicle 1 can share a ride with a user, the in-vehicle terminal 10 transmits a radio signal of a ride-sharing offer notice via broadcasting. Consequently, user terminals 20 located within a coverage of the radio signal (which have not been subjected to processing for matching the vehicle and the user with each other in advance) are notified of it being possible to share a ride. If a user of a user terminal 20 wishes to join the ride, a response to the radio signal is transmitted and a communication channel is established and vehicle-related information is provided and received. Subsequently, the user terminal 20 performs matching degree determination by comparison between the vehicle-related information and user-related information and determines whether or not the user can join a ride based on the matching degree and a result of the determination is provided to the in-vehicle terminal 10. Consequently, the in-vehicle terminal 10 can grasp whether or not user terminals 20 located in a predetermined range from the vehicle 1 can join a ride. In other words, even if ride-sharing users are unknown, it is possible to find a user who wishes to join a ride (user of a user terminal that has responded to a radio signal of a ride-sharing offer notice) and share a ride with the user. The user of the user terminal 20 can receive the ride-sharing offer notice from the vehicle 1 (in-vehicle terminal 10) and grasp that there is a vehicle 1 that can share a ride, determines whether or not it is possible to join a ride using information relating to the vehicle, the information being provided from the in-vehicle terminal 10 and provide a result of the determination to the in-vehicle terminal 10.

Also, in the first embodiment, a user terminal 20 receives the vehicle-related information from the in-vehicle terminal 10 and performs matching degree determination. At this time, the user terminal 20 can receive vehicle-related information pieces in parallel from a plurality of vehicles 1 and select a vehicle 1 in which the user joins a ride from the plurality of vehicles 1.

In the first embodiment, a radio signal of a ride-sharing offer notice is made to include destination information of the relevant vehicle to avoid a response and communication channel establishment if the destination of the vehicle and a destination of a user do not match. The information included in the radio signal of the ride-sharing offer notice (corresponding to first information) may be information other than the destination information or a combination of the destination information and information other than the destination information (attributes (a vehicle type, the gender and the age of the driver, etc.) of the vehicle and the driver). If the information included in the radio signal does not match the user's requests, a response and communication channel establishment are avoided.

Second Embodiment

Figure 10:
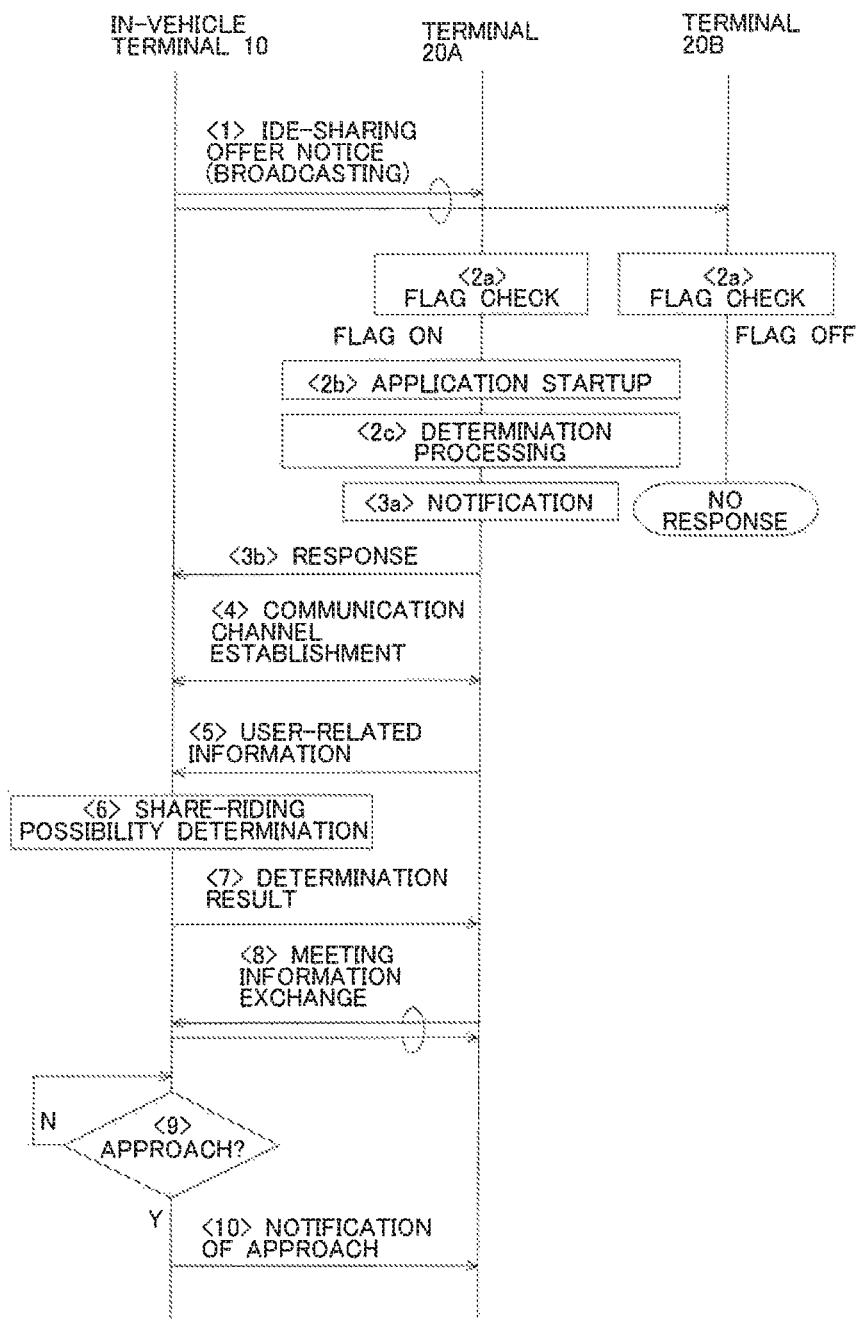
FIG. 10 is a sequence diagram illustrating an example operation according to a second embodiment.
Figure 11:
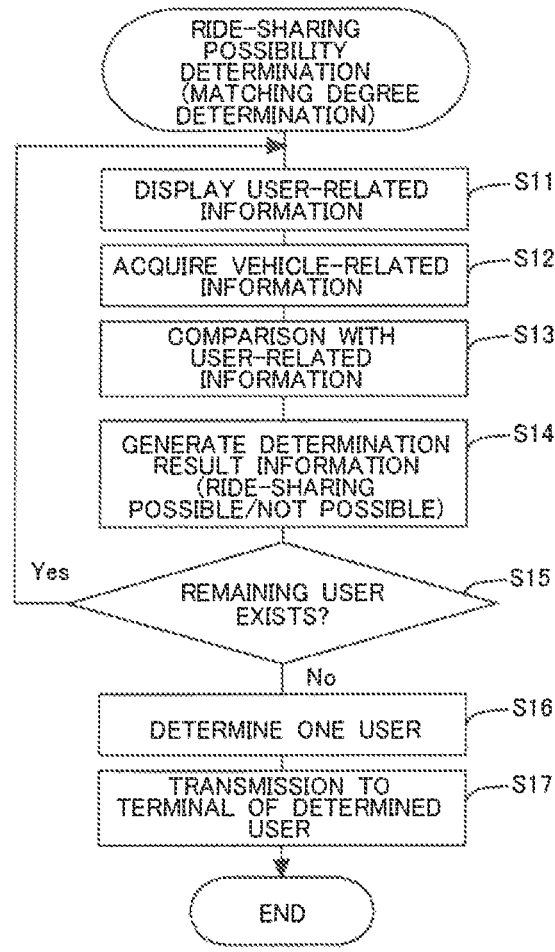
FIG. 11 is a flowchart illustrating an example of ride-sharing possibility determination processing performed in an in-vehicle terminal 10.

Next, a second embodiment will be described. The second embodiment has a configuration that is in common to the first embodiment and thus differences from the first embodiment will mainly be described. FIG. 10 is a sequence diagram illustrating an example operation according to the second embodiment and FIG. 11 is a flowchart illustrating an example of ride-sharing possibility determination processing performed in an in-vehicle terminal 10.

As illustrated in FIG. 10, in the second embodiment, after establishment of a communication channel between an in-vehicle terminal 10 and a user terminal 20 (for example, a user terminal 20A), user-related information is transmitted from the user terminal 20 to in-vehicle terminal 10 (FIG. 10<5>). As illustrated in FIG. 11, the in-vehicle terminal 10 compares the user-related information received from the user terminal 20 and vehicle-related information to determine matching degree determination and ride-sharing possibility determination (S11 to S14). A control unit 201 of the in-vehicle terminal 10 establishes communication channels with a plurality of user terminals 20 (for example, the user terminal 20A and a user terminal 20B illustrated in FIG. 10) in parallel and receives user-related information from each of the plurality of user terminals 20. Then, the control unit 201 of the in-vehicle terminal 10 can calculate a rate of coincidence for each of the user terminals 20 and decides a user of one of the user terminals 20 as a user with which a ride is to be shared (S16, S17).

Except the above configuration, the configuration of the second embodiment is similar to that of the first embodiment and description thereof will be omitted. As with the first embodiment, the second embodiment enables an in-vehicle terminal 10 to grasp whether or not a user terminal located within a predetermined range from a vehicle 1 can join a ride. Also, in the second embodiment, processing for ride-sharing possibility determination (matching degree determination) is performed in the in-vehicle terminal 10, which enables reduction of a load on user terminals 20 and thus contributes to power saving in the user terminals 20. Since the in-vehicle terminal 10 can be supplied with power from the vehicle 1 and thus a demand for power saving in the in-vehicle terminal 10 can be considered low compared to the user terminals 20.

Third Embodiment

Figure 12:
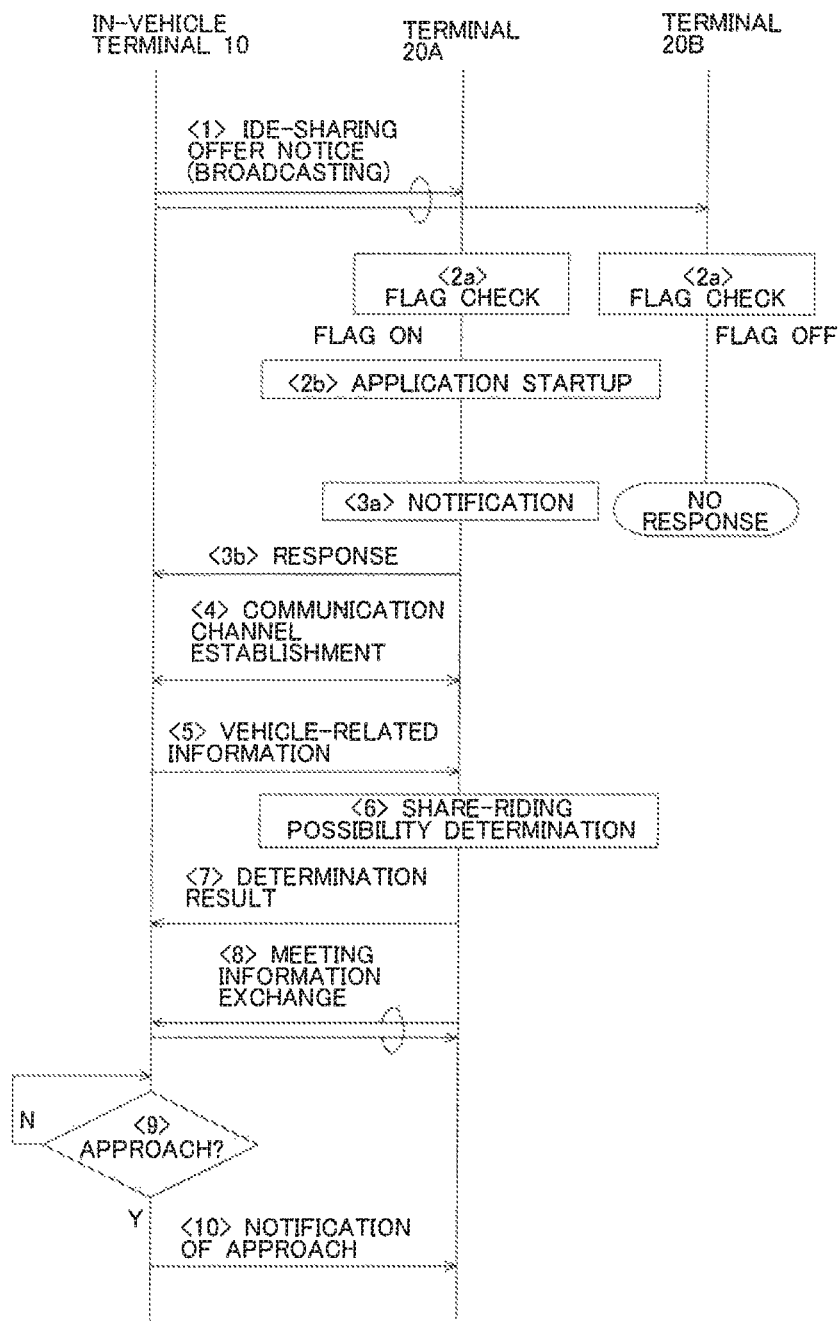
FIG. 12 is a sequence diagram illustrating an example operation according to a third embodiment.

Next a third embodiment will be described. The third embodiment has a configuration that is in common to the first embodiment and thus differences from the first embodiment will mainly be described. FIG. 12 is a sequence diagram illustrating an example operation according to the third embodiment and FIG. 13 is a flowchart illustrating an example of ride-sharing possibility determination processing in the third embodiment.

In third embodiment, a ride-sharing offer notice includes no destination information and the determination processing described in the first embodiment (FIG. 7<2c>) is not performed. Therefore, response transmission and communication channel establishment are performed as a result of a user performing an input to transmit a response to the ride-sharing offer notice to a relevant user terminal 20 (FIG. 12, <3b> and <4>).

Subsequently, vehicle-related information including destination information, vehicle attribute information, driver attribute information and ride-sharing condition information is transmitted to the user terminal 20 (20A) (FIG. 12<5>) and the user terminal 20 performs the ride-sharing possibility determination processing illustrated in FIG. 13.

Figure 13:
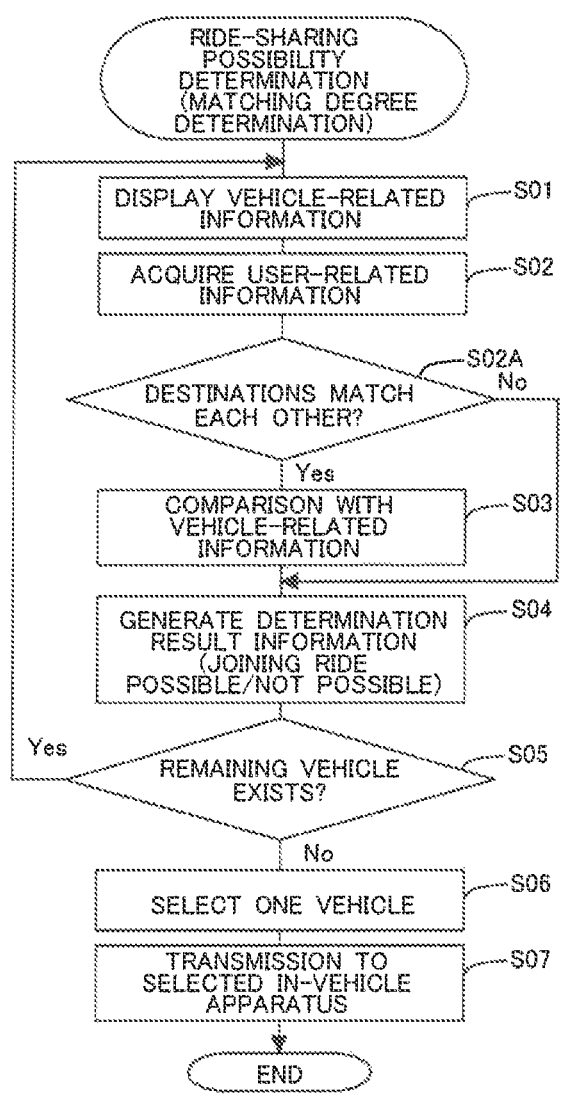
FIG. 13 is a flowchart illustrating an example of ride-sharing possibility determination processing in the third embodiment.

In the ride-sharing possibility determination processing according to the third embodiment, destination information included in vehicle-related information and destination information of a user are compared (S02A in FIG. 13). If the both do not match each other in the comparison, the control unit 221 generates a result of determination that it is not possible to join the ride.

Except the above point, the third embodiment is similar to the first embodiment and description thereof will be omitted. As with the first embodiment, the third embodiment enables an in-vehicle terminal 10 to grasp whether or not a user terminal located within a predetermined range from the relevant vehicle 1 can join a ride. Also, according to the third embodiment, transmission/reception of information for determination of whether or not to join a ride (vehicle-related information), which is provided in two installments in the first and second embodiments, is performed collectively at one time (FIG. 12<5>) and ride-sharing determination processing using the vehicle-related information also collectively performed at one time (FIG. 12<6>). Therefore, the processing in the user terminal 20 is simplified. Also, as in the second embodiment, a user terminal 20 may transmit user-related information including destination information to an in-vehicle terminal 10 and ride-sharing possibility determination may be performed in the in-vehicle terminal 10.

Fourth Embodiment

Figure 14:
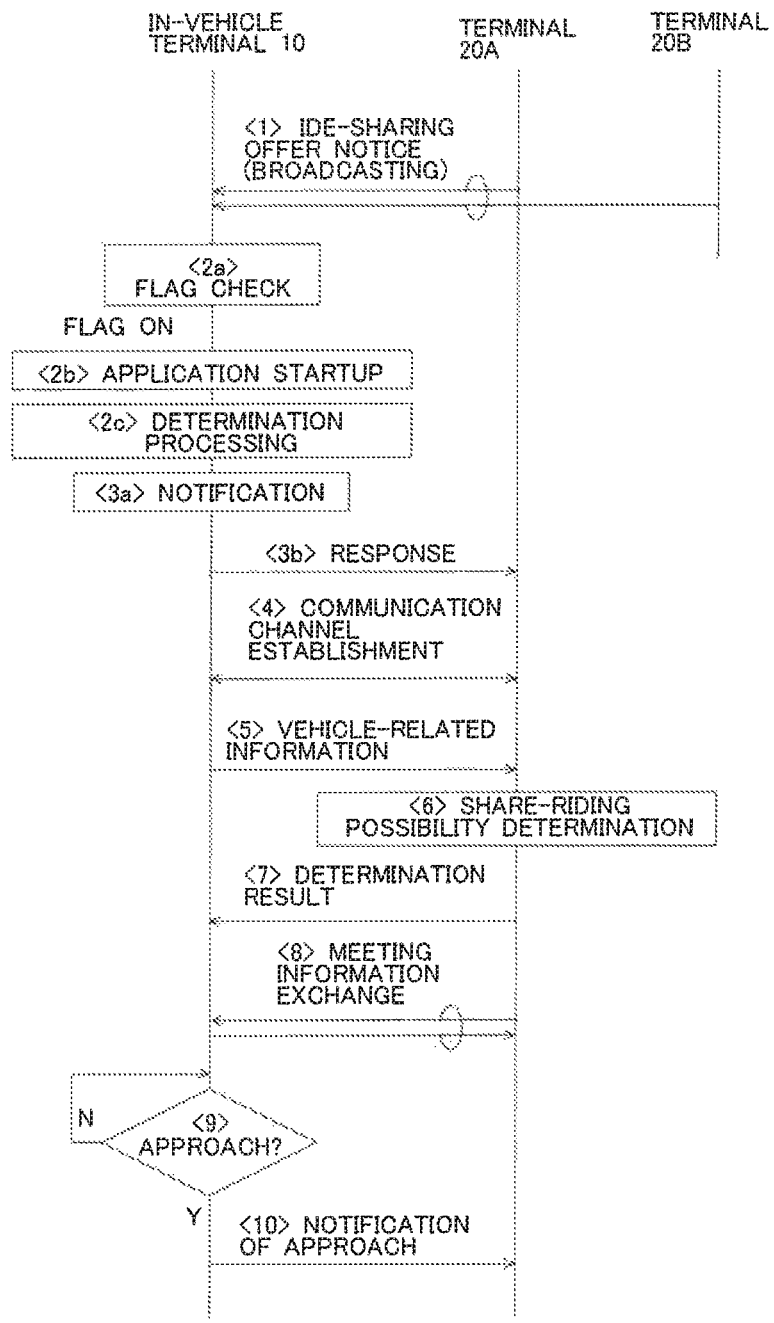
FIG. 14 is a sequence diagram illustrating an example operation according to a fourth embodiment.

Next, a fourth embodiment will be described. The fourth embodiment has a configuration that is in common to the first embodiment and thus differences from the first embodiment will mainly be described. FIG. 14 is a sequence diagram illustrating an example operation according to the fourth embodiment.

In the first embodiment, an in-vehicle terminal 10 transmits a ride-sharing offer notice to user terminals 20 and a response signal transmitted from a user terminal 20 is received by the in-vehicle terminal 10 as a "signal indicating a request to join a ride". The fourth embodiment takes a form that does not perform transmission of a ride-sharing offer notice.

In other words, in the fourth embodiment, in response to an input of a request to join a ride (for example, an input using an input device 225) by a user of a user terminal 20, the user terminal 20 transmits a ride-sharing request notice (corresponding to a "signal indicating a ride-sharing request") via broadcasting (FIG. 14<1>). Each of user terminals 20 can broadcast a ride-sharing request notice irrespective of the other user terminal 20.

In the fourth embodiment, the processing in <2a>, <2b>, <2c>, <3a> and <3b> in FIG. 7, which has been described in the first embodiment, is performed by an in-vehicle terminal 10 (<2a>, <2b>, <2c>, <3a> and <3b> in FIG. 14). Consequently, if a driver of a relevant vehicle 1 determines that it is possible to respond to the request to join a ride, transmission of a response to the user terminal 20 and communication channel establishment are performed. A configuration in which if ride-sharing request notices are received in parallel from a plurality of user terminals 20, a single ride-sharing request notice is accepted can be employed. Also, a configuration in which a plurality of ride-sharing request notices are received, vehicle-related information is transmitted to each user terminal 20, a result of ride-sharing possibility determination is received from each user terminal 20 and a user terminal 20 with which a ride is to be shared is selected may be employed. As in the first embodiment, the fourth embodiment enables grasping whether or not a user terminals 20 located within a predetermined range from a vehicle 1 (located within a range in which a radio signal of a ride-sharing request notice reaches the vehicle 1) based on a result of ride-sharing possibility determination even if the in-vehicle terminal 10 does not transmit a ride-sharing offer notice.

The processing and measures described in the above first to fourth embodiments can freely be combined as long as such combination causes no technical contradiction. For example, in the first to fourth embodiments, a part of the processing performed by one of the in-vehicle terminal 10 and the user terminal 20 may be performed by the other.

Also, the processing described as processing performed by a single apparatus may be shared and performed by a plurality of apparatuses. Alternatively, the processing described as processing performed by different apparatuses may be performed by a single apparatus. In a computer system, what hardware configuration (server configuration) to be employed to provide the respective functions can flexibly be changed.

Each of an in-vehicle terminal 10 and a user terminal 20 according to the first to fourth embodiments can also be provided by supplying computer programs providing the functions described in the above embodiments to a computer and causing one or more processors included in the computer to read and execute the programs. Such computer programs may be provided to the computer via a non-transient computer-readable storage medium that is connectable to a system bus of the computer or may be provided to the computer via a network. Examples of the non-transient computer-readable storage medium include arbitrary types of disks including magnetic disks (e.g., a floppy (registered trademark) disk and a hard disk drive (HDD)) and optical disks (e.g., a CD-ROM, a DVD disk and a Blu-ray disk), a read-only memory (ROM), a random access memory (RAM), an EPROM, an EEPROM, a magnetic card, a flash memory, an optical card, and an arbitrary type of medium suitable for storing an electronic instruction.

What is claimed is:

1. An in-vehicle terminal mounted in a vehicle, the in-vehicle terminal comprising:
   a controller configured to: transmit a radio signal indicating that a carpooling ride in the vehicle is available to a plurality of users within a coverage area of the radio signal without receiving a prompt from the plurality of users;
   upon receiving an acknowledgement of the radio signal from a user terminal that is boated within the coverage area of the radio signal, transmit information relating to the vehicle to the user terminal, the information being used when the user terminal selects the vehicle;

receive information indicating a result of a determination of whether or not a user of the user terminal is able to join the carpooling ride in the vehicle from the user terminal, the determination being made based on the transmitted information relating to the vehicle; and wherein the radio signal indicating that the carpooling ride in the vehicle is available to the plurality of users is initiated by an occupant inside the vehicle.

2. The in-vehicle terminal according to claim 1, wherein:
the controller transmits the radio signal via broadcasting;
the controller receives the response from each of one or more user terminals including the user terminal and transmits the information relating to the vehicle to the one or more user terminals; and
the controller receives, from at least one user terminal including the user terminal from among the one or more user terminals, information indicating a result of determination of whether or not a user of the at least one user terminal is able to join the ride in the vehicle, the determination being made using the information relating to the vehicle.

3. The in-vehicle terminal according to claim 2, wherein the controller establishes a communication channel with the user terminal that has transmitted the response, transmits/receives the information relating to the vehicle and the information indicating the result of determination, using the communication channel.

4. The in-vehicle terminal according to claim 1, wherein:
the controller transmits the radio signal including first information in the information relating to the vehicle; and
the controller receives the response from the user terminal having user request information matching the first information from among a plurality of user terminals that are located within the coverage of the radio signal and is able to receive the radio signal.

5. The in-vehicle terminal according to claim 1, wherein the information relating to the vehicle includes at least one of information indicating a destination of the vehicle, information indicating an attribute of the vehicle, information indicating an attribute of a driver of the vehicle and information indicating a ride-sharing condition other than the attribute of the vehicle and the attribute of the driver.

6. The in-vehicle terminal according to claim 1, wherein in case where the user is allowed to join the ride in the vehicle, the controller transmits assistance information for assisting in the user riding in the vehicle to the user terminal.

7. The in-vehicle terminal according to claim 6, wherein when a distance between the vehicle and the user terminal becomes shorter than a predetermined value, the controller transmits information for notification of approach of the vehicle, to the user terminal.

8. The in-vehicle terminal according to claim 1, wherein the radio signal is first transmitted to the plurality of users within the coverage area of the radio signal without receiving a carpooling request from the plurality of users.

9. A ride-sharing control method comprising causing an in-vehicle terminal mounted in a vehicle to:
transmit a radio signal indicating a carpooling ride in the vehicle is available to a plurality of users within a coverage area of the radio signal without receiving a prompt from the plurality of users;
upon receiving an acknowledgement of the radio signal from a user terminal that is located within the coverage area of the radio signal, transmit information relating to the vehicle to the user terminal, the information being used when the user terminal selects the vehicle;
receive information indicating a result of a determination of whether or not a user of the user terminal is able to join the carpooling ride in the vehicle from the user terminal, the determination being made based on the transmitted information relating to the vehicle; and
wherein the radio signal indicating that the carpooling ride in the vehicle is available to the plurality of users is initiated by an occupant inside the vehicle.

10. The ride-sharing control method according to claim 9, wherein the radio signal is first transmitted to the plurality of users within the coverage area of the radio signal without receiving a carpooling request from the plurality of users.

11. A non-transitory computer readable medium storing a program for use with a processor in a vehicle, the program causing the processor to execute steps comprising:
transmitting, via a radio antenna, a radio signal indicating a carpooling ride in the vehicle is available to a plurality of users within a coverage area of the radio signal without receiving a prompt from the plurality of users;
upon receiving an acknowledgement of the radio signal from a user terminal that is located within the coverage area of the radio signal, transmitting information relating to the vehicle to the user terminal, the information being used when the user terminal selects the vehicle;
receiving information indicating a result of a determination of whether or not a user of the user terminal is able to join the carpooling ride in the vehicle from the user terminal, the determination being made based on the transmitted information relating to the vehicle; and
wherein the radio signal indicating that the carpooling ride in the vehicle is available to the plurality of users is initiated by an occupant inside the vehicle.

12. The non-transitory computer readable medium according to claim 11, wherein the radio signal is first transmitted to the plurality of users within the coverage area of the radio signal without receiving a carpooling request from the plurality of users.

* * * * *